Feb. 27, 1962 A. A. KAHN ET AL 3,023,320
MULTI-PURPOSE LOGICAL ARRAY USING PROGRAMMED SIGNAL CANCELLATION
Filed Aug. 25, 1960 2 Sheets-Sheet 1

INVENTORS
ALLAN A. KAHN
HERMANN P. WOLFF
BY P. E. Henninger
ATTORNEY

United States Patent Office 3,023,320

Patented Feb. 27, 1962

3,023,320

MULTI-PURPOSE LOGICAL ARRAY USING PROGRAMMED SIGNAL CANCELLATION

Allan A. Kahn and Hermann P. Wolff, Poughkeepsie, N.Y., assignors to International Business Machines Corporation, New York, N.Y., a corporation of New York Filed Aug. 25, 1960, Ser. No. 51,861
7 Claims. (Cl. 307—88)

This invention relates to a multi-purpose logic unit.

More particularly, the invention relates to a logic unit wherein a multiplicity of logical functions may be performed selectively by programed signal cancellation under the control of one or more control elements.

In its specific form, the invention contemplates a multi-purpose logical array made up of a first and a second group of saturable cores and at least one control core. An input line couples a core of the first and second group such that when energized, one of the coupled cores will be turned to the one state and the other thereof will be turned to the zero state. A sense winding couples all of the cores and is wound through the array such as to receive a positive voltage from cores of the first group when they are turned from the one state to the zero state and a negative voltage from the cores of the second group when they are turned from the one state to the zero state. A reset winding coupling all of the cores is provided for resetting the array to a predetermined state.

It is the purpose of the invention to provide a logical array whose function can be altered instantaneously by applying control pulses to one or more pairs of control cores. To this end, it is contemplated that one or more pairs of control cores may be included in the array and that an input line be provided for each pair of control cores for turning one of the cores to one state and the other thereof to the zero state.

Logical circuits are widely used in electronic computers and data processing machines for the sensing of AND and OR conditions, i.e., the coincident presence of a number of conditions or the presence of any one of a number of conditions. It is to this class of unit to which the invention relates.

It can be appreciated that if a single unit can be selectively employed for the performance of a plurality of ordinarily diverse functions that a great saving can be effected. Accordingly, it is the principal purpose of this invention to provide a logic unit which is capable of performing both the AND and the OR functions.

The principle of the invention will become clear from a consideration of its application in a variety of forms which will be developed in the following specification and illustrated in the drawings.

In the drawings:

FIG. 1 is a diagrammatic representation of a saturable core matrix designed to produce a positive output whenever more than one-half of its inputs are satisfied. In the example of FIG. 1, the matrix is assumed to have 50 inputs thereto and it is so arranged as to produce a positive output on its sense winding when 25 or more of the inputs are satisfied.

Figure 1:
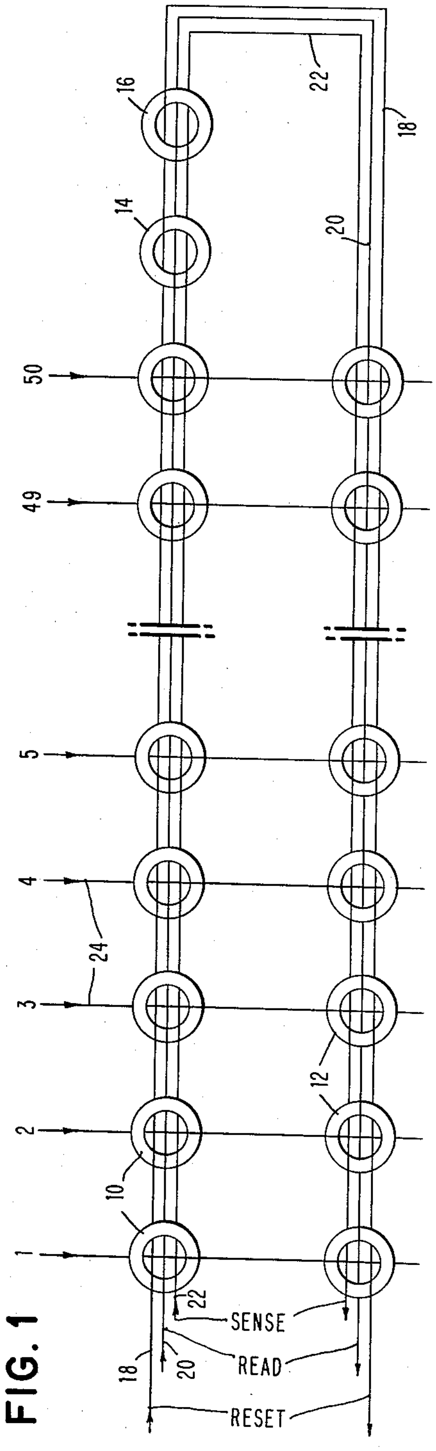
FIG. 1 is a diagrammatic representation of a saturable core array having control means adapting it to detect the presence of 25 or more out of 50 inputs.

The cores 10 of a first group of cores are paired with those of a second group 12. These groups constitute an upper row and a lower row. Associated with the upper row of cores 10 are a pair of control cores 14 and 16. All of the cores are interconnected by a reset winding 18, a read winding 20 and a sense winding 22. The reset winding 18 is so wound through the cores that when it is energized, it will set the cores 10 of the upper row to their zero state, and the cores 12 of the lower row to the one state. The control cores 14 and 16 are also set to the one state.

When a read pulse is impressed on the read winding 20 all cores set in the one state will be reset to the zero state. The sense winding 22 is so threaded through the cores as to have induced therein a positive voltage when any of the cores 10 of the upper row or either or both of the control cores 14 and 16 are switched from one to zero, and negative voltage is induced in the sense winding when any of the cores 12 of the lower row are switched from one to zero. The sense winding 22 effectively sums the voltages induced therein upon switching of the cores from one to zero.

With the foregoing in mind, therefore, it can be seen that if a read pulse is applied to the read winding 20 after the matrix has been reset as described, the cores 10 will remain in their zero state, the control cores 14 and 16 will be switched to their zero state, thereby producing two positive outputs, while the cores 12 of the bottom row will be switched from their one state to the zero state thereby producing 50 outputs in the negative direction with the result that a large negative output appears on the sense winding.

Pairs of cores 10 and 12 are connected by an input winding 24 such that each of the 50 core pairs of the matrix can be controlled by applying input pulses to the windings 24. When an input pulse is applied to an input winding, the same will switch its cores from the zero state to the one state and from the one state to the zero state. No input windings are connected to the control cores 14 and 16.

Assuming that the matrix has been reset, as described, and an input pulse is applied to 24 of the core pairs, this will switch the 24 cores of the upper row to their one state and the corresponding 24 cores of the bottom row to their zero state. The remaining 26 pairs of interconnected cores will remain as reset, i.e., those of the upper row will remain at zero, while those of the bottom row will remain at one. The control cores 14 and 16 will be reset, i.e., in the one state. Now when a read pulse is applied to the read winding 20, all the cores in the one state are reversed to their zero state. This results in a positive output on the sense winding from 24 cores of the upper row to which the input pulse was applied and also from the two control cores 14 and 16. Twenty-six positive outputs are, therefore, induced in the sense winding and the sum of these outputs is cancelled by the 26 negative outputs induced by the cores of the bottom row whose reset condition was not changed by inputs on the input windings 24. Thus, no output of either polarity is sensed on the sense winding 22.

If, however, 25 of the cores 10 of the top row have input pulses applied to their input windings 24 such that these 25 are switched to their one state, 27 of the cores of the upper row including the control cores 14 and 16 will, at read time, produce positive outputs in the sense winding 22. Since only 25 cores of the bottom row produce negative outputs at read time, there will be a net positive output on the sense winding indicating that 25 or more of the core pairs have inputs applied thereto.

The performance of the matrix can be altered by adding or subtracting control cores such as the cores 14 and 16. An increase in the number of control cores decreases the number of inputs necessary to produce a positive output on the sense winding. On the other hand, a decrease in the number of control cores increases the number of inputs necessary to produce a positive output. For example, if a third control core is added to the cores 14 and 16 in the upper row of the 50 input matrix, the number of inputs required to produce a positive output is reduced to 24. On the other hand, if only one of the control cores 14 or 16 is employed, the number of inputs to produce a positive output is increased to 26. This logic can be expanded to produce a matrix requiring any desired number of inputs to produce a positive output. For example, were it desired to produce a positive output upon satisfaction of 20 inputs, 11 control cores would be required. By the same token, if 21 or more inputs are to produce a positive output, 10 control cores would be required. Furthermore, if the control cores are conditioned to give a negative response upon resetting from one to zero at read time, the number of inputs required to produce a positive output on the sense winding can be greatly increased.

Whereas the foregoing example relates to a logical unit of fixed performance, the principle is readily expanded to embrace logical units whose performance may be varied. By way of example, FIG. 2 discloses a logical unit which is basically a 3-way AND circuit whose inputs 30, 32 and 34 constitute windings of paired cores 36—38, 40—42, 44—46, respectively. When any of the inputs are energized, the cores affected thereby will be switched from their zero state to a one state, or from the one state to the zero state.

Figure 2:
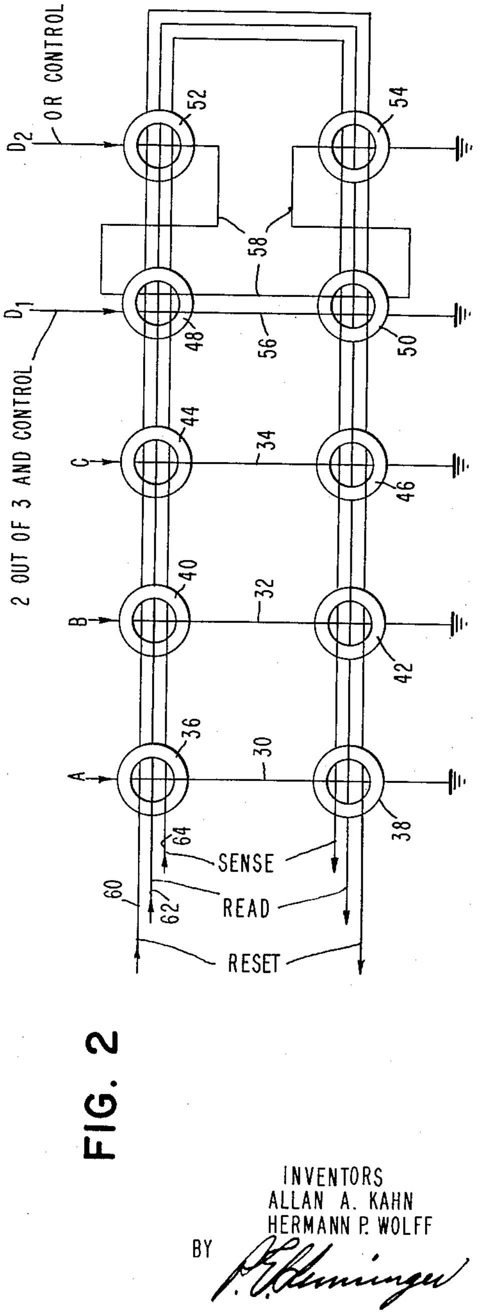
FIG. 2 is a diagrammatic representation of a saturable core array capable of operating as a 3-way AND circuit, a 2-way AND circuit and an OR circuit.

Two additional sets of cores 48—50 and 52—54 are provided for the dynamic control of the circuit of FIG. 2, such that its performance can be altered for the production of a positive output on the sense winding of the matrix when an input is applied to any two of its three inputs 30, 32 and 34, respectively, or to any one of these inputs. In the first case, a positive output is produced if any two of the three inputs are satisfied and in the second case, a positive output is produced if an input pulse is applied to any one or more of the inputs. This latter, in effect, alters the performance of the unit such that it operates as an OR circuit.

In order to control the performance of the unit of FIG. 2, the cores 48 and 50 have applied thereto a control winding 56 which, when energized, will result in a positive output when any two of the three input windings 30, 32 and 34 are energized. The control cores 48 and 50 are also connected with the cores 52 and 54 by means of a control winding 58 which, when energized, will cause the unit to produce a positive output when any one of the input windings 30, 32 or 34 has been energized. Windings 56 and 58 will also drive the connected cores from zero to one or from one to zero.

All of the cores are interconnected by a reset winding 60 which, when energized, will switch the logic cores 36—48 and the control cores 48 and 52 of the upper row to the zero state, and the logic cores 38—50 and the control cores 50 and 54 of the bottom row to the one state. A read winding 62 is threaded through all the cores and, when impulsed, will switch a core from its one state to its zero state. A sense winding 64 is so threaded through the cores that when a core of the upper row is switched from one to zero at read time, a positive voltage will be induced in the sense winding, while a negative voltage will be induced in the sense winding whenever a core of the bottom row is switched from one to zero at read time. The induced voltages are present on the sense winding as the net sum of the voltages.

In normal operation, the unit of FIG. 2 is reset by applying a pulse to the reset winding 60. This sets the cores 36—52 of the upper row to their zero state and the cores 38—54 of the bottom row to their one state, as stated. A voltage on the read winding 62 will now switch the cores of the bottom row from their one state to their zero state and thus induce a large negative pulse on the sense winding 64.

If input pulses are applied to the input windings 30, 32 and 34 after the unit has been reset, as described above, the cores 36, 40 and 44 of the upper row will be switched to their one state whereas the cores 38, 42 and 46 will be switched to their zero state. Application of a pulse to the read winding 62 will now return the cores 36, 40 and 44 to their zero state and thereby induce a large positive output in the sense winding 64.

When the unit has been reset and a pulse is applied to the control winding 56, the core 48 will be set to its one state and the core 50 will be set to its zero state. If, under these conditions, any two of the inputs 30, 32 and 34 are energized, a positive output will be produced on the sense winding at read time. Assume that an input is applied to the inputs 32 and 34 which interconnect respectively core pairs 40—42 and 44—46. Cores 40, 44 and 48 of the upper row will now be in their one state, the corresponding cores of these pairs in the lower row will be in their zero state, cores 36 and 52 of the upper row will be in their zero state and their corresponding cores 38 and 54, respectively, of the lower row will be in their one state. Now when a read pulse is applied to the read winding 62, cores 40, 44 and 48 of the upper row will be driven to the zero state thereby producing three increments of output voltage, whereas cores 38 and 54 of the bottom row will also be driven to their zero state but will produce only two increments of negative output voltage. The net result of this is that a positive output voltage will appear on the sense winding 64.

Upon reset of the unit, as described, by application of a reset pulse to the sense winding 60 and the application of a control pulse to the control winding 58, the unit will be so conditioned that cores 36, 40 and 44 of the upper row will be in the zero state while corresponding cores 38, 42 and 46, respectively, of the bottom row are in their one state. The pulse on the control winding 58 is effective to set the control cores 48 and 52 of the upper row to their one state and the corresponding control cores 50 and 54, respectively, of the bottom row to their zero state. If an input is applied to the input winding 30, for example, the core 36 will be set to its one state and the second core of the pair 38 in the bottom row will be set to its zero state. If a read pulse is now applied to the read winding 62, cores 36, 48 and 52 will be returned to their zero state thereby inducing three increments of positive output voltage in the sense winding 64. By the same token, cores 42 and 46 of the bottom row will be reset to the zero state thereby inducing two increments of negative output voltage in the sense winding 64 with the net result that a positive output voltage is available on the sense winding 64.

Figure 3:
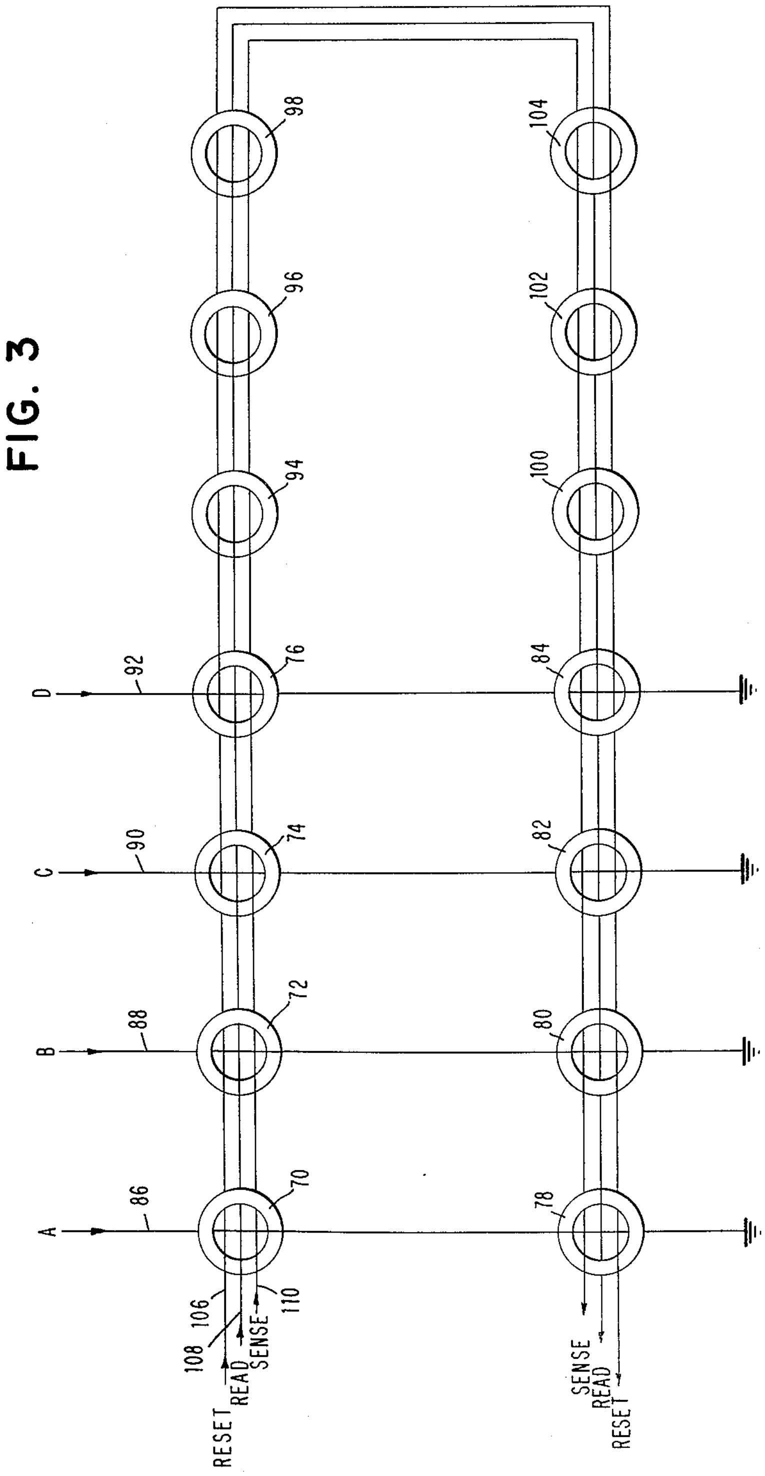
FIG. 3 is a diagrammatic representation of saturable core array so controlled as to perform the function $A\,B\,\bar{C}\,\bar{D}$.

One more example will serve to fully illuminate the broad application of the invention. Accordingly, FIG. 3 discloses a logical unit for performing the function $A\ B\ \bar{C}\ \bar{D}$, i.e., the detection of the presence of two conditions and the absence of two other conditions. In this unit, four logic cores 70, 72, 74 and 76 of an upper row are connected respectively with logic cores 78, 80, 82 and 84 of a bottom row by means of input windings 86, 88, 90 and 92; the input winding 86 connecting cores 70—78, the input winding 88 connecting cores 72—80, the input winding 90 connecting cores 70—82 and the input winding 92 connecting cores 76—84. Disposed in the upper row of cores, are control cores 94, 96 and 98, while aligned with those of the lower row are control cores 100, 102 and 104. All of the cores are interconnected by a reset winding 106, a read winding 108 and a sense winding 110. The reset winding when energized will set cores 74 and 76 of the upper row to the one state and all of the remaining cores of the upper row to the zero state; while cores 82 and 84 of the lower row will be set to the zero state and all of the remaining cores of the bottom row will be set to the one state. If a read pulse were applied to the read winding 108 after resetting the unit, as described, cores 74 and 76 would be reset to the zero state thereby inducing two increments of positive voltage in the sense winding 110. However, the same read pulse would reset cores 78, 80, 100, 102 and 104 of the bottom row to their zero state thereby inducing five increments of negative voltage in the sense winding with the result that net three increments of negative output voltage would appear on the sense winding 110.

If after reset, as described above, a pulse is applied not only to the inputs 86, 88 but also to the inputs 90 and 92, the illogical condition will again be reflected by a negative output on the sense winding. For, under these conditions, the inputs will reverse their cores from whatever state such that the cores 70 and 72 will be switched to their one state and their corresponding cores 78 and 80 will be switched to their zero state. By the same token, the cores 74 and 76 will be switched to their zero state while their corresponding cores 82 and 84 will be switched to their one state. All of the control cores 94, 96 and 98 of the upper row will remain in their zero state as reset, and the control cores 100, 102 and 104 of the bottom row will remain in their one state as reset. Upon driving the cores set in their one state to their zero state, there will be only two increments of positive voltage induced in the sense winding 110 by the cores of the upper row, specifically cores 70 and 72, while five increments of negative voltage will be induced by the cores being switched from one to zero in the bottom row; these being logic cores 82 and 84 and control cores 100, 102 and 104. A negative output is also produced if three of the four inputs are satisfied.

If the inputs 86 and 88 are energized after the unit has been reset, but the inputs 90 and 92 are not so energized, a condition prevails in which the logic cores 70, 72, 74 and 76 of the upper row are in their one state, while the control cores 94, 96 and 98 of the upper row are in their zero state. Conversely, the logic cores 78—80, 82 and 84 of the bottom row are in their zero state and control cores 100, 102 and 104 of the bottom row are in their one state. If at such time a read pulse is applied to the read winding 108, those cores in the one state of the upper row will produce a positive increment of induced output voltage in the sense winding 110. and those cores in the one state of the bottom row will be returned to the zero state and produce increments of negative output voltage in the sense winding.

Since the cores 70, 72, 74 and 76 of the upper row will each produce an increment of positive voltage as they are being returned to their zero state by a read pulse, and only control cores 100, 102 and 104 of the bottom row will produce like increments but in the negative direction as they are being reset from one to zero at read time. There is, therefore, produced in the sense winding 110 a positive output voltage indicative of the fact that the logical function has been satisfied.

Suitable input, reset and read drivers and a suitable sense amplifier will be provided for driving the various input lines and for amplifying the output on the sense line. A number of suitable systems are available to those skilled in the art.

While the fundamentally novel features of the invention have been illustrated and described in connection with specific embodiments of the invention, it is believed that these embodiments will enable others skilled in the art to apply the principles of the invention in forms departing from the exemplary embodiment herein, and such departures are contemplated by the claims.

What is claimed is:

1. A logic array comprising a first and second group of saturable cores, a plurality of separate input lines, each input line coupling a core of said first and second group of cores such that when energized one of said coupled cores will be turned to the one state and the other thereof will be turned to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

2. A multi-purpose logic array comprising a first and second group of saturable cores and at least one control core, a plurality of separate input lines, each input line coupling a core of said first and second group of cores such that when energized one of said coupled cores will be turned to the one state and the other thereof will be turned to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

3. A multi-purpose logic array comprising a first and second group of saturable cores and a plurality of control cores, a plurality of separate input lines, each input line coupling a core of said first and second group of cores such that when energized one of said coupled cores will be turned to the one state and the other thereof will be turned to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

4. A multi-purpose logic array comprising a first and second group of saturable cores and at least one pair of control cores, a plurality of separate input lines, each input line coupling a core of said first and second group of cores such that when energized one of said coupled cores will be turned to the one state and the other thereof will be turned to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

5. A multi-purpose logic array comprising a first and second group of saturable cores and at least one pair of control cores, a plurality of separate input lines, each input line coupling a core of said first and second group of cores such that when energized one of said coupled cores will be turned to the one state and the other thereof will be turned to the zero state, an input line coupling said control cores for turning one of said control cores to the one state and the other thereof to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

6. A multi-purpose logic array comprising a first and second group of saturable cores and a plurality of pairs of control cores, a plurality of separate input lines, each input line coupling a core of said first and second group of cores such that when energized one of said coupled cores will be turned to the one state and the other thereof will be turned to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

7. A multi-purpose logic array comprising a first and second group of saturable cores and a plurality of pairs of control cores, a plurality of separate input lines, each input line coupling a core of said first and second group of cores such that when energized one of said coupled cores will be turned to the one state and the other thereof will be turned to the zero state, an input line coupling the cores of each pair of control cores for turning one of said control cores to the one state and the other thereof to the zero state, a sense winding coupling all of said cores, said sense winding being in such direction as to receive a positive voltage from cores of said first group when turned from the one state to the zero state and a negative voltage from cores of said second group when turned from the one state to the zero state, a reset winding coupling all of said cores for resetting the same to a predetermined state, and means for applying a read pulse to the cores of said array.

No references cited.